UNITED STATES PATENT OFFICE.

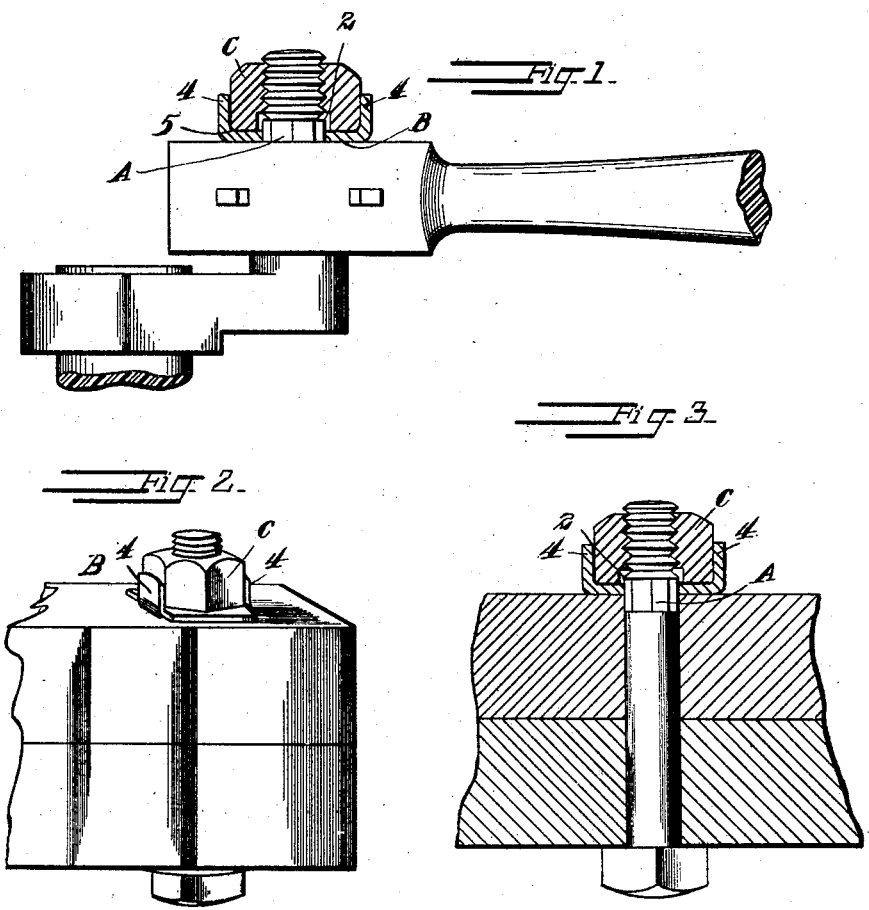

ALBERT J. LOGAN, OF CLEARFIELD, PENNSYLVANIA.

NUT-LOCK.

No. 858,191.   Specification of Letters Patent.   Patented June 25, 1907.

Application filed June 15, 1906. Serial No. 321,919.

*To all whom it may concern:*

Be it known that I, ALBERT J. LOGAN, a citizen of the United States, residing at Clearfield, in the county of Clearfield and State of Pennsylvania, have invented certain new and useful Improvements in Nut-Locks, of which the following is a specification.

My invention relates to an improvement in nut locks and the primary object of the invention is to provide a lock which will be simple, durable and inexpensive while efficiently performing the functions required of an article of this character.

With these objects in view, my invention consists in certain novel features of construction and combinations of parts which will be hereinafter described and pointed out in the claims.

In the accompanying drawings: Figure 1 is a view in which the nut lock is shown applied to a crank shaft, portions being broken away and in section. Fig. 2 is a view in perspective showing the nut lock in position. Fig. 3 is a sectional view. Fig. 4 is a view of one form of lock. Fig. 5 illustrates a slightly modified form of lock.

A, represents an angular and preferably octagonal formation on the bolt as in Fig. 3, or it may be on a wrist pin as in Fig. 1, the idea being that this angular or octagonal portion A shall not greatly lessen the diameter of the bolt or wrist pin and it may be formed by removing a portion of the bolt or wrist pin adjacent to the screw-threads.

B, is the nut lock, two forms of which are illustrated in Figs. 4 and 5, respectively, they being provided with a central orifice 1, of angular form preferably octagonal to correspond with the formation on the bolt or wrist pin which this orifice is adapted to receive and fit whereby to prevent its turning thereon. While the thickness of the nut lock B may vary, indefinitely, it is designed to be of less thickness than the length of the angular portion of the bolt or wrist pin so as to admit of the nut being screwed down tight.

The nut is indicated by the letter C and in the preferred form as shown in Figs. 1 and 2, this nut is provided with a recess 2 adapted to span the angular portion A of the bolt or wrist pin so as to allow the nut to turn freely around said angular portion while the threads are turning upon the bolt or pin.

The nut may be turned on tight or loose as desired after being screwed home the projecting tongues 4, 4, on the ends of the nut lock B are bent up against the side of the nut as shown in Figs. 1, 2, and 3, thus holding it against turning, the nut lock itself being similarly held by the angular portion A as explained which the orifice 1, of the nut lock receives and fits. In this way, it is not necessary that the nut should be screwed down tight so long as the nut lock maintains its position upon the angular formation A of the bolt or pin. Of course, in the great majority of cases, however, it is desirable that the nut should be screwed tightly in place and when so screwed it forces the nut lock down against the bolt or member, it being free to slide upon the angular portion, which latter should be of sufficient length relative to the bolt or member in which it is placed so as to provide for allowing the nut lock to be forced down as far as required.

In Fig. 1, the inner corners of the nut are shown slightly rounded as at 5 as this prevents too sharp an angle in the nut lock when bent. This is particularly desirable where the parts are large and the nut lock correspondingly thick, and avoids the danger of the latter being broken in bending.

In this way, I provide a very simple and efficient means of locking nuts, and a device which may be made easily and cheaply and applied or removed without difficulty or waste of time.

Slight changes might be resorted to in the form and arrangement of the several parts described without departure from the spirit and scope of my invention, and hence I do not wish to limit myself to the exact construction herein set forth, but:—

Having fully described my invention, what I claim as new and desire to secure by Letters Patent, is:—

A nut lock comprising a rounded or cylindrical bolt having a head at one end and a thread at the other and provided with an angular formation of limited extent at the end of the bolt immediately adjacent to the thread, a locking plate having an orifice of corresponding shape adapted to fit this angular formation whereby it is prevented from turning thereon, and a nut adapted to screw on the threads and portions of the lock adapted to be bent against the side or sides of the nut, the threaded bore of the nut enlarged at the inner end to afford clearance for the angular formation on the bolt.

In testimony whereof I have signed my name to this specification in the presence of two subscribing witnesses.

ALBERT J. LOGAN.

Witnesses:
NELL M. STEPHENS,
LENO WM. EDWARDS.